(12) United States Patent
Boda et al.

(10) Patent No.: US 8,033,529 B2
(45) Date of Patent: Oct. 11, 2011

(54) RATCHETED LIFT MECHANISM

(76) Inventors: James C. Boda, Merrimac, WI (US);
Robert T. Schofield, Brooklyn, WI (US)

( * ) Notice: Subject to any disclaimer, the term of this patent is extended or adjusted under 35 U.S.C. 154(b) by 0 days.

(21) Appl. No.: 12/387,990

(22) Filed: May 11, 2009

(65) Prior Publication Data

US 2010/0283021 A1 Nov. 11, 2010

Related U.S. Application Data

(63) Continuation of application No. 11/879,998, filed on Jul. 19, 2007, now Pat. No. 7,533,869.
(60) Provisional application No. 60/832,166, filed on Jul. 20, 2006.

(51) Int. Cl.
*B66D 1/30* (2006.01)
(52) U.S. Cl. .......................... 254/372; 254/376
(58) Field of Classification Search .................. 254/252, 254/258, 372, 376, 369
See application file for complete search history.

(56) References Cited

U.S. PATENT DOCUMENTS

| | | | | |
|---|---|---|---|---|
| 3,872,972 A | * | 3/1975 | Cummins et al. ............... | 211/17 |
| 3,924,751 A | * | 12/1975 | Ballenger ........................ | 211/17 |
| 5,156,377 A | * | 10/1992 | Nishimura ..................... | 254/346 |
| 5,897,104 A | * | 4/1999 | Garbiso ......................... | 254/334 |
| 6,161,702 A | * | 12/2000 | Campbell ........................ | 211/17 |
| 6,209,852 B1 | * | 4/2001 | George et al. .................. | 254/372 |
| 6,634,610 B1 | * | 10/2003 | Ricci et al. .................. | 248/330.1 |
| 6,695,292 B2 | * | 2/2004 | Nam .............................. | 254/267 |
| 6,799,751 B1 | * | 10/2004 | Anderson ...................... | 254/223 |
| 7,137,618 B2 | * | 11/2006 | Koenecke ....................... | 254/372 |
| 7,198,219 B1 | * | 4/2007 | Alajajyan et al. .............. | 242/247 |
| 7,226,039 B2 | * | 6/2007 | Sauner et al. .................. | 254/323 |
| 7,284,745 B2 | * | 10/2007 | Keane et al. ................... | 254/372 |
| 7,370,843 B2 | * | 5/2008 | Dueck ........................... | 254/277 |
| 7,401,765 B2 | * | 7/2008 | Xia et al. ...................... | 254/352 |
| 7,494,110 B2 | * | 2/2009 | Lob et al. ...................... | 254/334 |
| 7,533,869 B2 | * | 5/2009 | Boda et al. ..................... | 254/352 |
| 7,575,224 B1 | * | 8/2009 | Madland ........................ | 254/380 |
| 2008/0017839 A1 | * | 1/2008 | Boda et al. ..................... | 254/352 |

* cited by examiner

*Primary Examiner* — Emmanu M Marcelo
(74) *Attorney, Agent, or Firm* — Smith Law Office

(57) ABSTRACT

The present invention is related generally to hoists, and more particularly to a hoist system for safely raising, storing, and lowering loads.

20 Claims, 10 Drawing Sheets

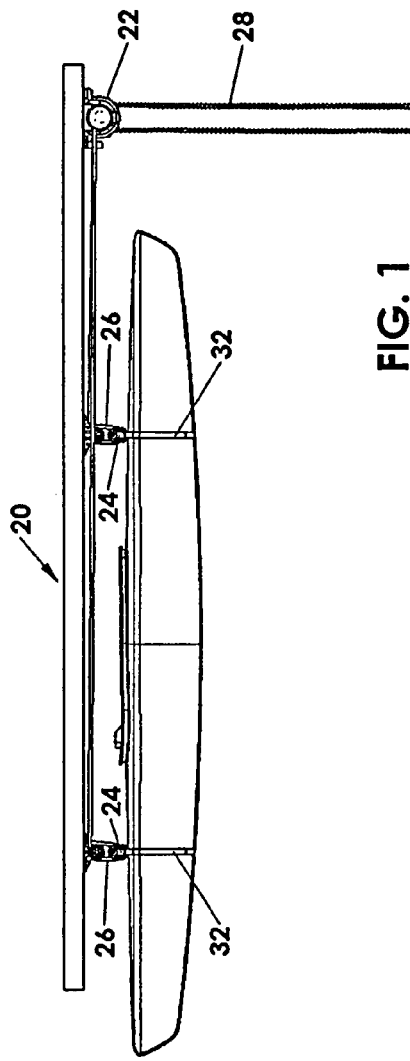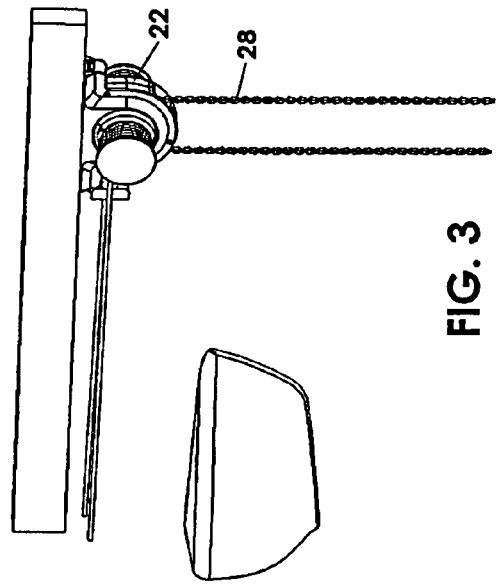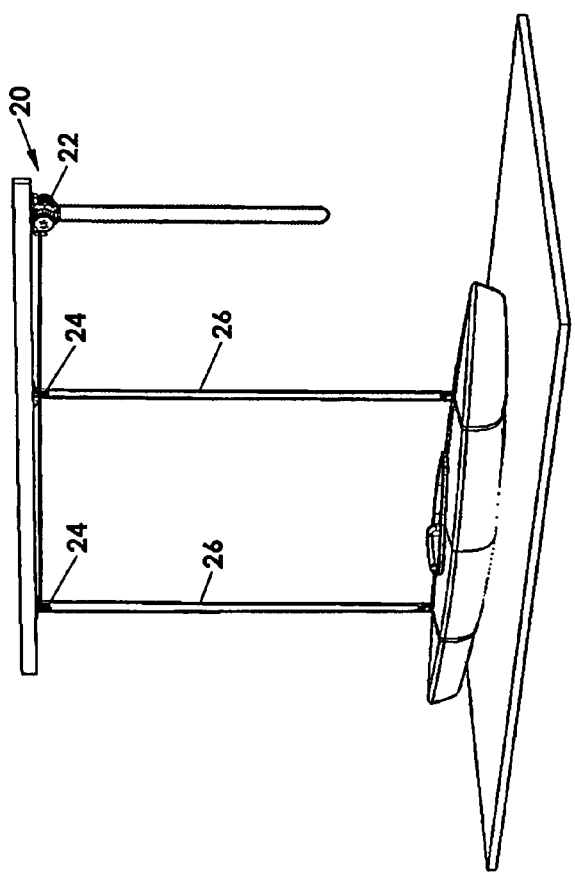

RATCHETED LIFT MECHANISM

This application is a continuation of application Ser. No. 11/879,998 filed Jul. 19, 2007 now U.S. Pat. No. 7,533,869 which claims priority on Application No. 60/832,166 filed Jul. 20, 2006, the disclosures of which are incorporated by reference herein.

FIELD AND BACKGROUND OF THE INVENTION

The present invention is related generally to hoists, and more particularly to a hoist system for safely raising, storing, and lowering loads.

Storage for recreational equipment such as bicycles, canoes, kayaks, and other equipment is sometimes considered inefficient because of space limitations in garages, basements, and sheds. Recreational equipment tends to consume much-needed space and may be inconvenient to access and load onto vehicles when desired. Consequently, storage and use of recreational equipment can inhibit consumers from using, enjoying, and even purchasing such equipment due to storage space limitations.

Various racks and hoist systems are available for consumer use, but they tend to be complicated, unsafe, and have space consuming problems of their own. There is, therefore, a need for a simple and safe system for storing recreational gear and other equipment.

SUMMARY OF THE INVENTION

The present invention is directed to a hoist system for raising, storing, and lowering loads in a safe and efficient manner. The hoist is easily and safely used to store recreational equipment in residential garages and sheds to optimize space by storing such equipment overhead.

Also, the present invention can be used in garages so that vehicles can be positioned under the hoist system so that equipment can be directly raised from and lowered to the vehicles and/or racks connected to the vehicles. Such an arrangement simplifies loading and unloading of recreational equipment and may be compatible with specialized vehicle racks.

BRIEF DESCRIPTION OF DRAWINGS

FIG. 1 is a side view of a lift mechanism in accordance with the present invention;

FIG. 2 is a perspective view of the lift mechanism of FIG. 1;

FIG. 3 is a partial perspective view of a ratchet mechanism in accordance with the present invention;

DETAILED DESCRIPTION OF THE INVENTION

Figure 4:
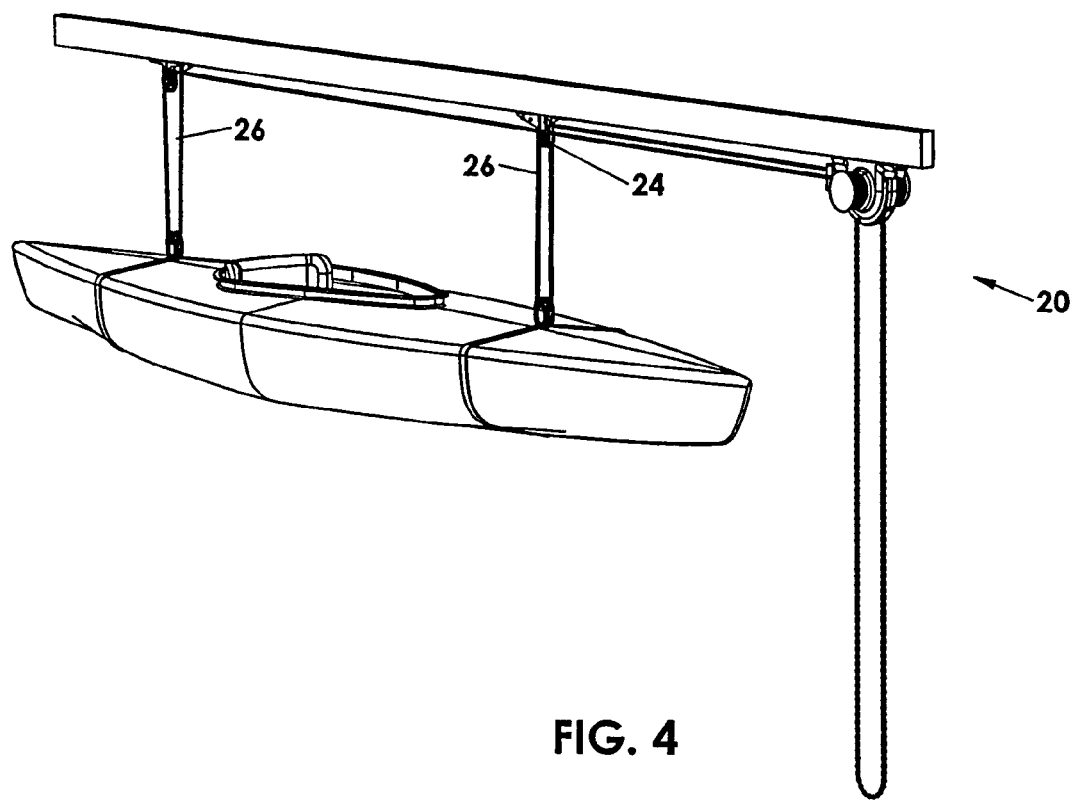
FIG. 4 is a perspective view of a ratchet mechanism in accordance with the present invention.
Figure 5:
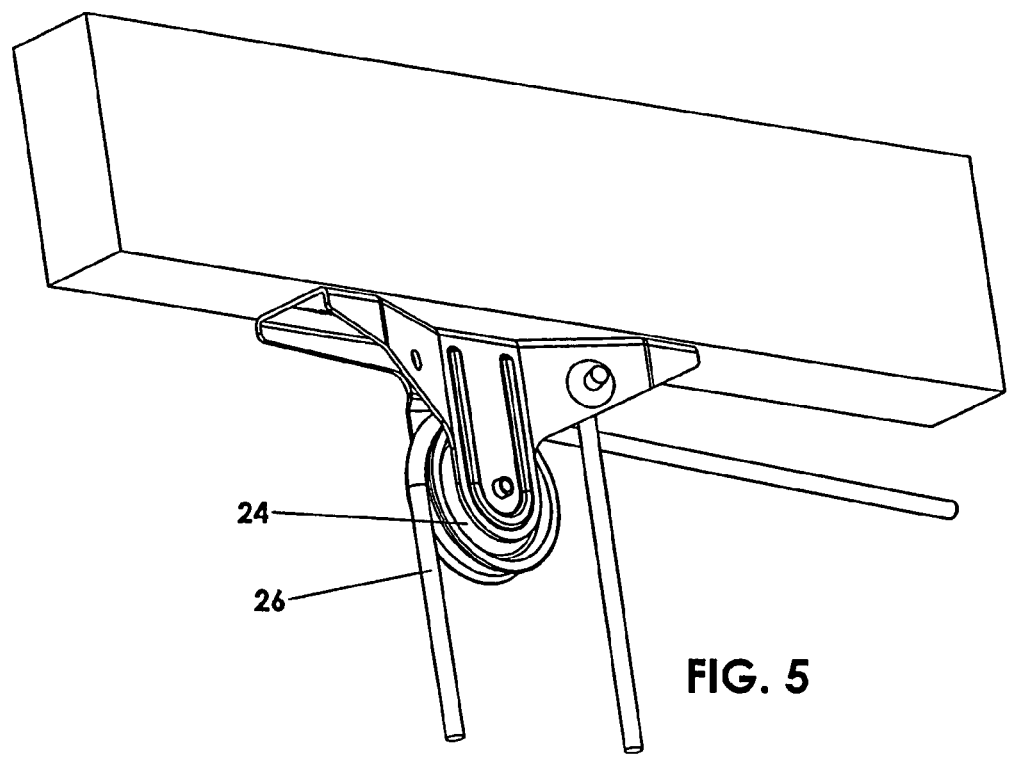
FIG. 5 is a perspective view of a pulley for use in the lift mechanism in accordance with the present invention.
Figure 6:
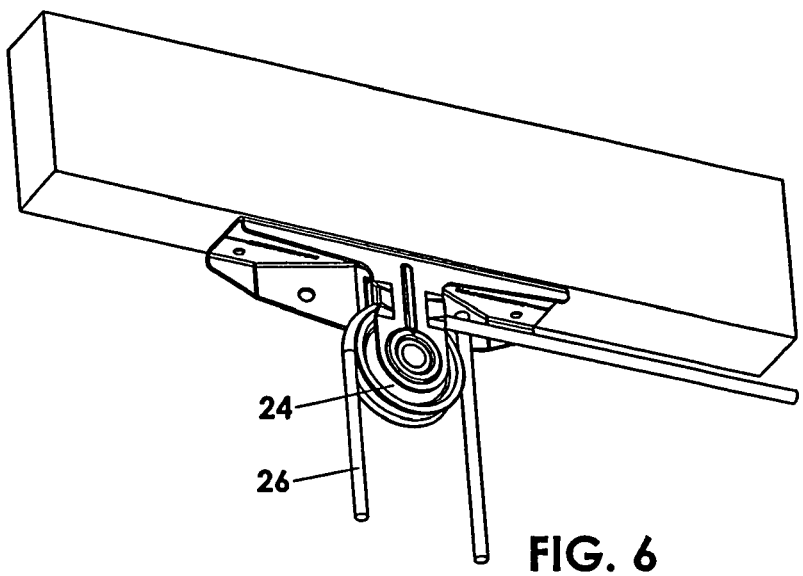
FIG. 6 is another perspective view of a pulley for use in the lift mechanism in accordance with the present invention.
Figure 7:
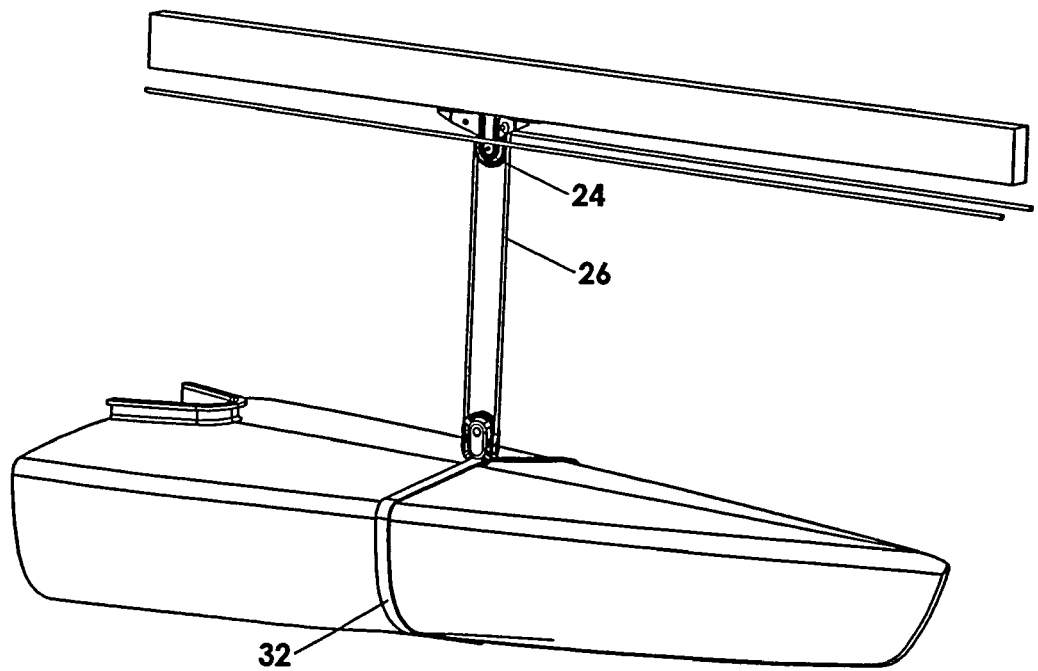
FIG. 7 is a perspective view of a pulley combination for use in a lift mechanism in accordance with the present invention.
Figure 8:
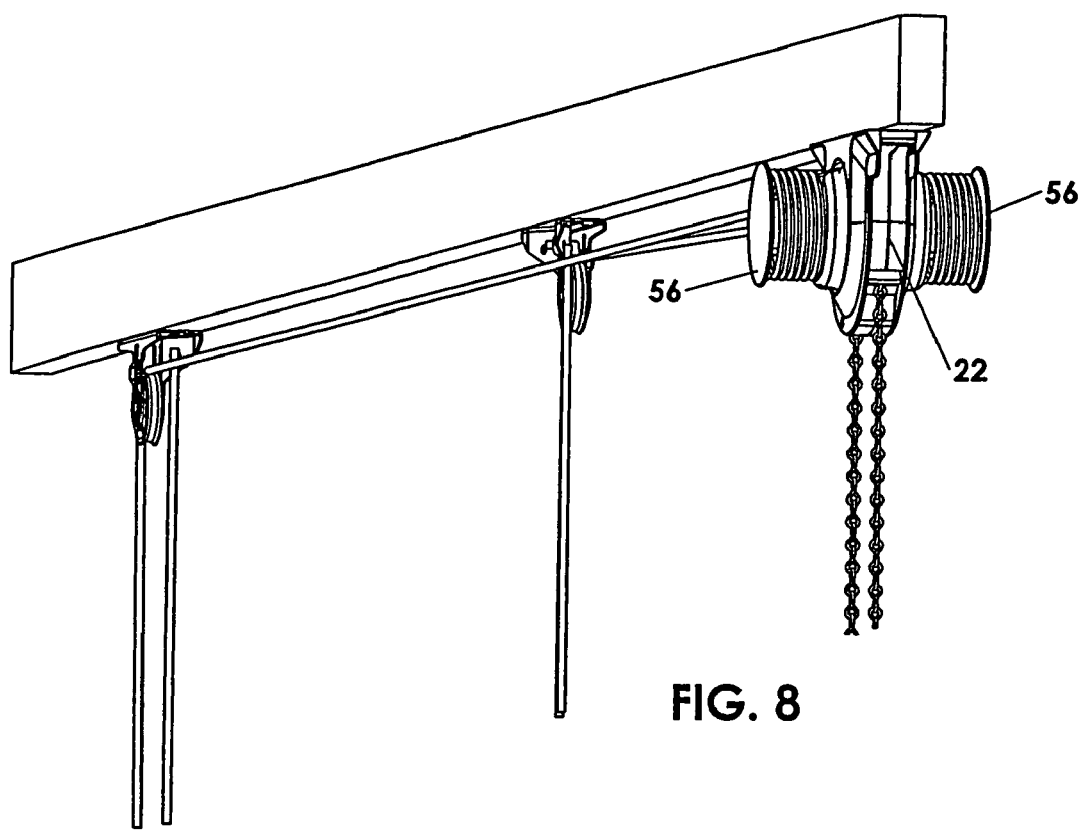
FIG. 8 is a perspective view of a ratcheted lift mechanism and pulley arrangement in accordance with the present invention.
Figure 9:
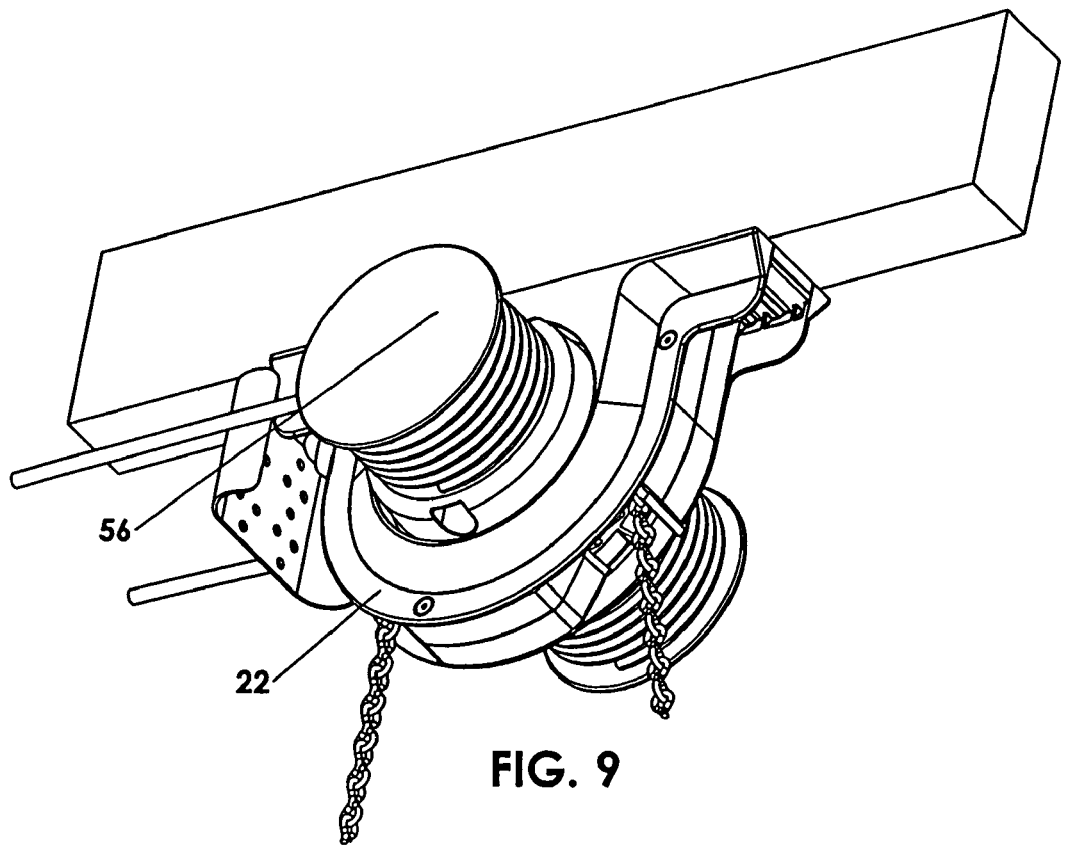
FIG. 9 is a perspective view of a ratchet mechanism secured to an overhead joist in accordance with the present invention.
Figure 10:
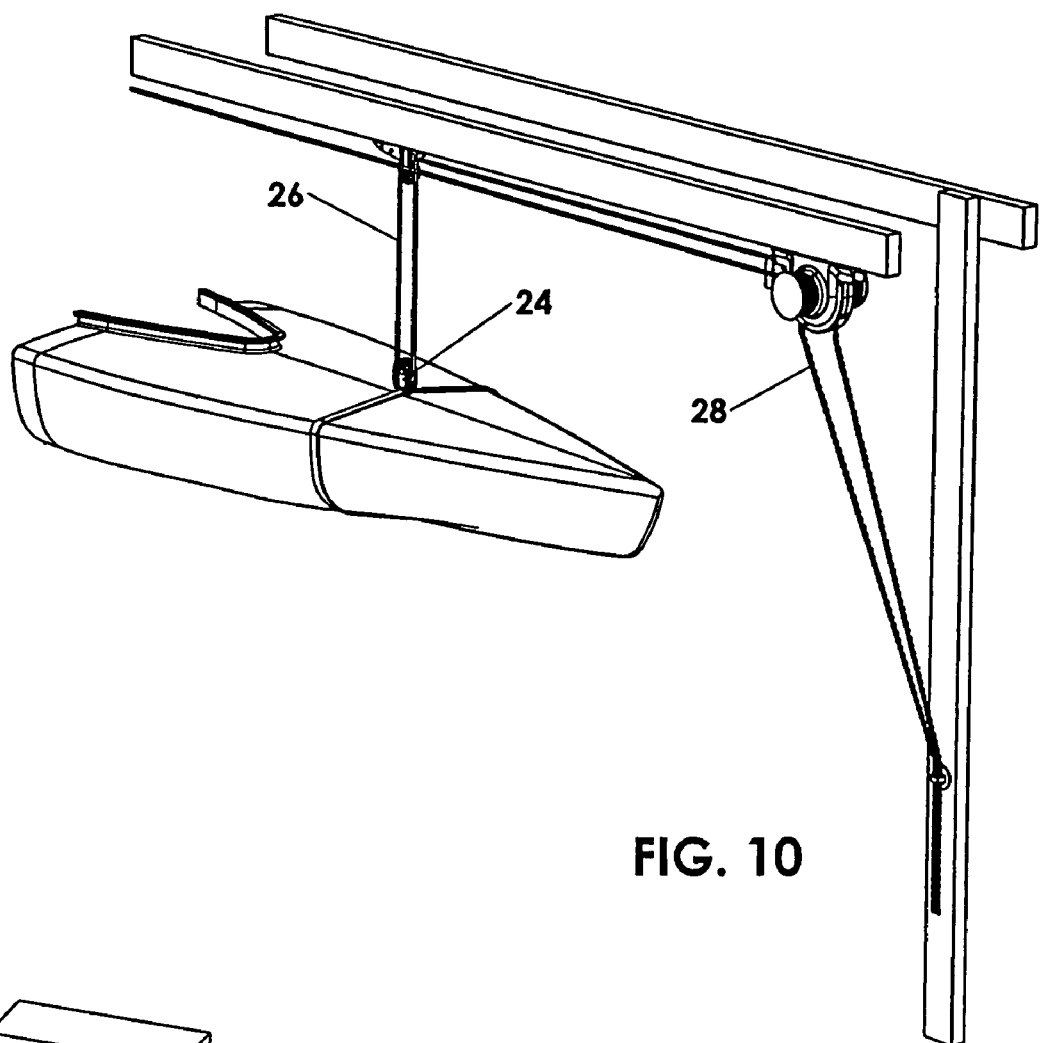
FIG. 10 is a partial perspective view of a ratcheted lift mechanism with a side eyelet for securing a pull chain in accordance with the present invention.
Figure 11:
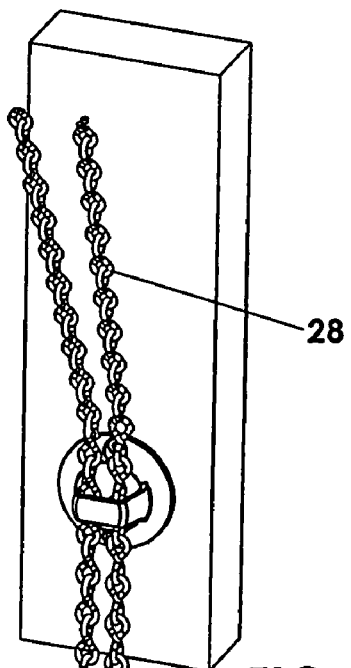
FIG. 11 is a detailed perspective view of the eyelet of FIG. 10.
Figure 12:
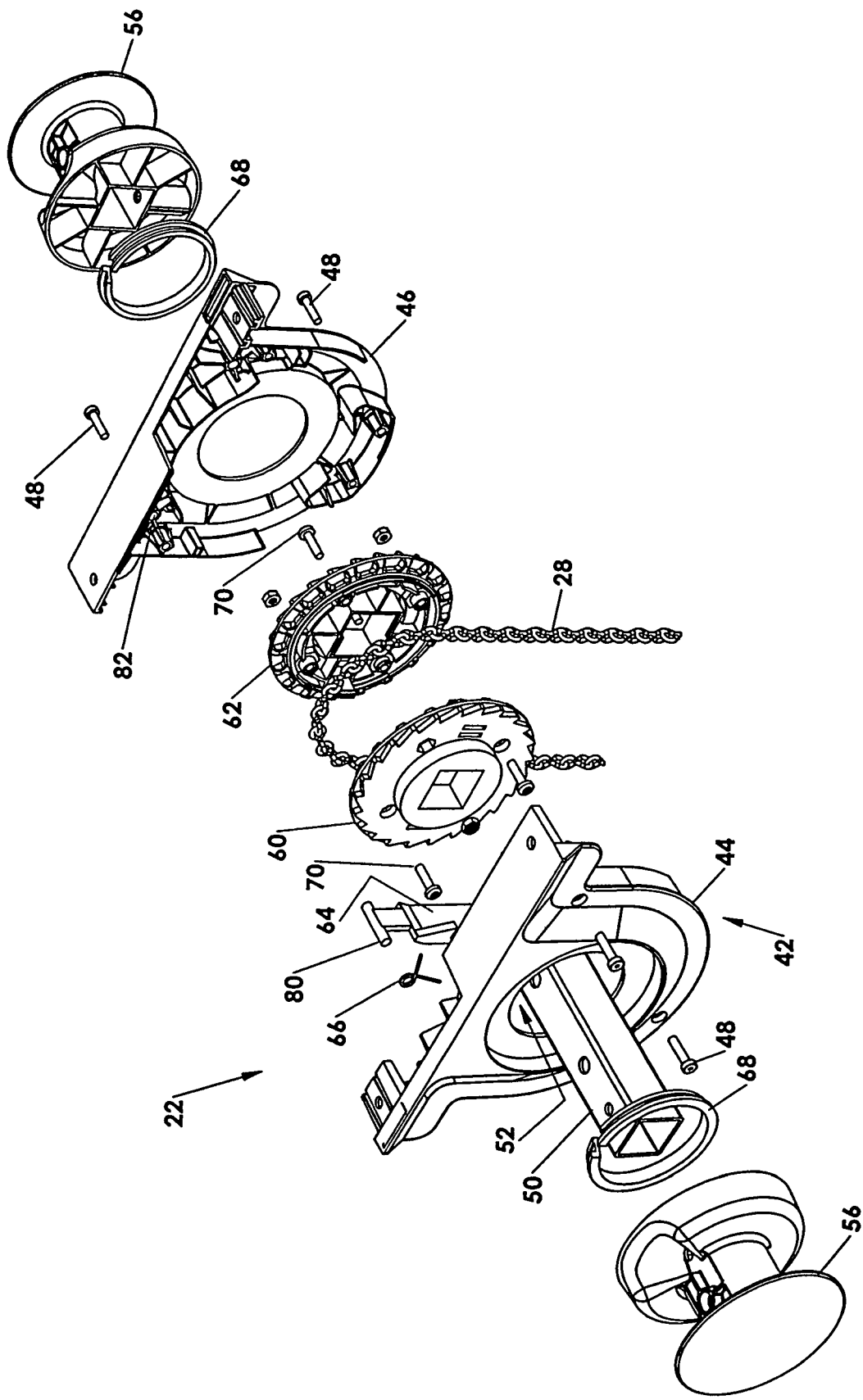
FIG. 12 is an exploded view of a ratchet mechanism in accordance with the present invention.

A hoist system 20 in accordance with the present invention is depicted in FIGS. 1 through 18. The hoist system 20 includes a hoist 22, passive pulleys 24, supporting cables 26, and a drive chain 28. The hoist system 20 may also include a storage platform 30 (FIG. 13) or straps 32 (FIG. 1) or hooks 34 (FIG. 14) to engage and support a load.

As seen in FIGS. 1, 2, 4, 7, 10, 13 and 14, the storage system 20 is preferably used to lift, store, and lower loads such as recreational equipment 40, including boats, kayaks, bicycles, and other gear or boxes. The storage system 20 of the present invention is preferably installed in garages to optimize storage space, and is more preferably stored above an area where an automobile can be driven so that loads can be directly raised from and lowered to the automobile. For example, a kayak can be raised and lowered directing to a roof-top rack on an automobile by installing the hoist system 20 of the present invention in a garage ceiling.

The hoist 22 includes a frame 42 defined by a first portion 44 and a second portion 46 that are joined by screws 48 to house at least some of the moveable components. There is also included a drive shaft 50 extending through an opening 52 defined by the frame 42. On each end of the drive shaft 50, there are spools 56 for receiving the supporting cables 26, although the supporting cables 26 could be attached directly to the drive shaft 50. Preferably, the drive shaft 50 is square or rectangular in cross-section to obviate the need for keys that will fix its movement with other moving components.

Inside the first and second portions 44 and 46 of the frame 42, there are a ratchet gear 60, a drive gear 62, a pawl 64 for engaging the ratchet gear 60, a spring 66 for biasing the pawl 64 into engagement with the ratchet gear 60, and a pair of bearings 68 for supporting the ratchet gear 60 and the drive gear 62 in the frame 42. The drive chain 28 is disposed between the ratchet gear 60 and the drive gear 62. Preferably, the drive chain 28 is endless for ease of operation. It may be coated with plastic or in a protective sleeve to prevent damage to a user's hands or nearby vehicles and equipment.

The ratchet gear 60 and drive gear 62 are preferably joined together with screws 70 to maintain the drive chain 28 in place and maintain positive contact between the components as they move with little or no slippage. The pawl 64 pivots in the frame 42 about an integral pin 80 that mates with appropriate recesses 82 in the frame 42.

Figure 13:
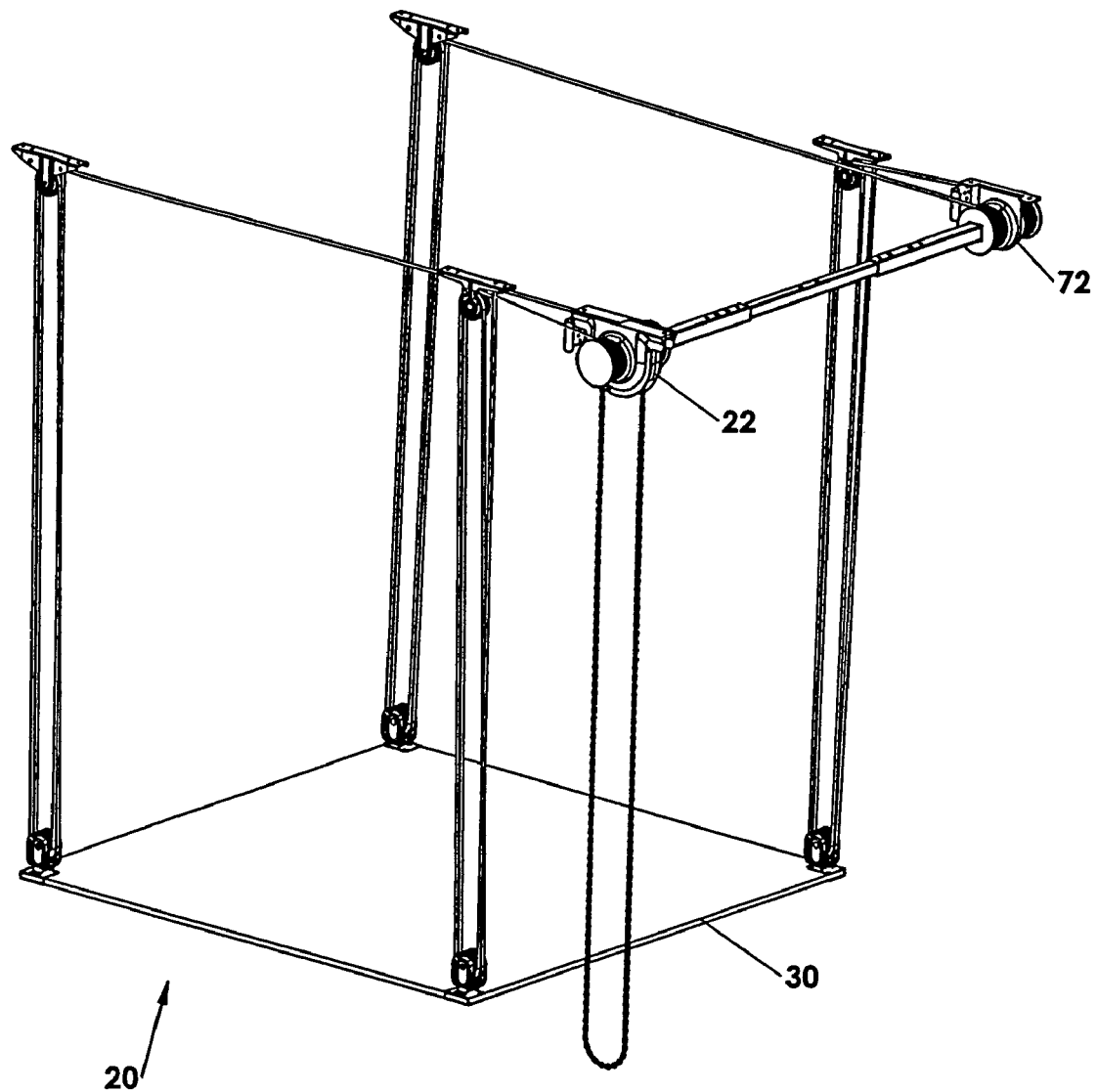
FIG. 13 is a perspective view of a lift system using two ratchet mechanisms in accordance with the present invention.
Figure 14:
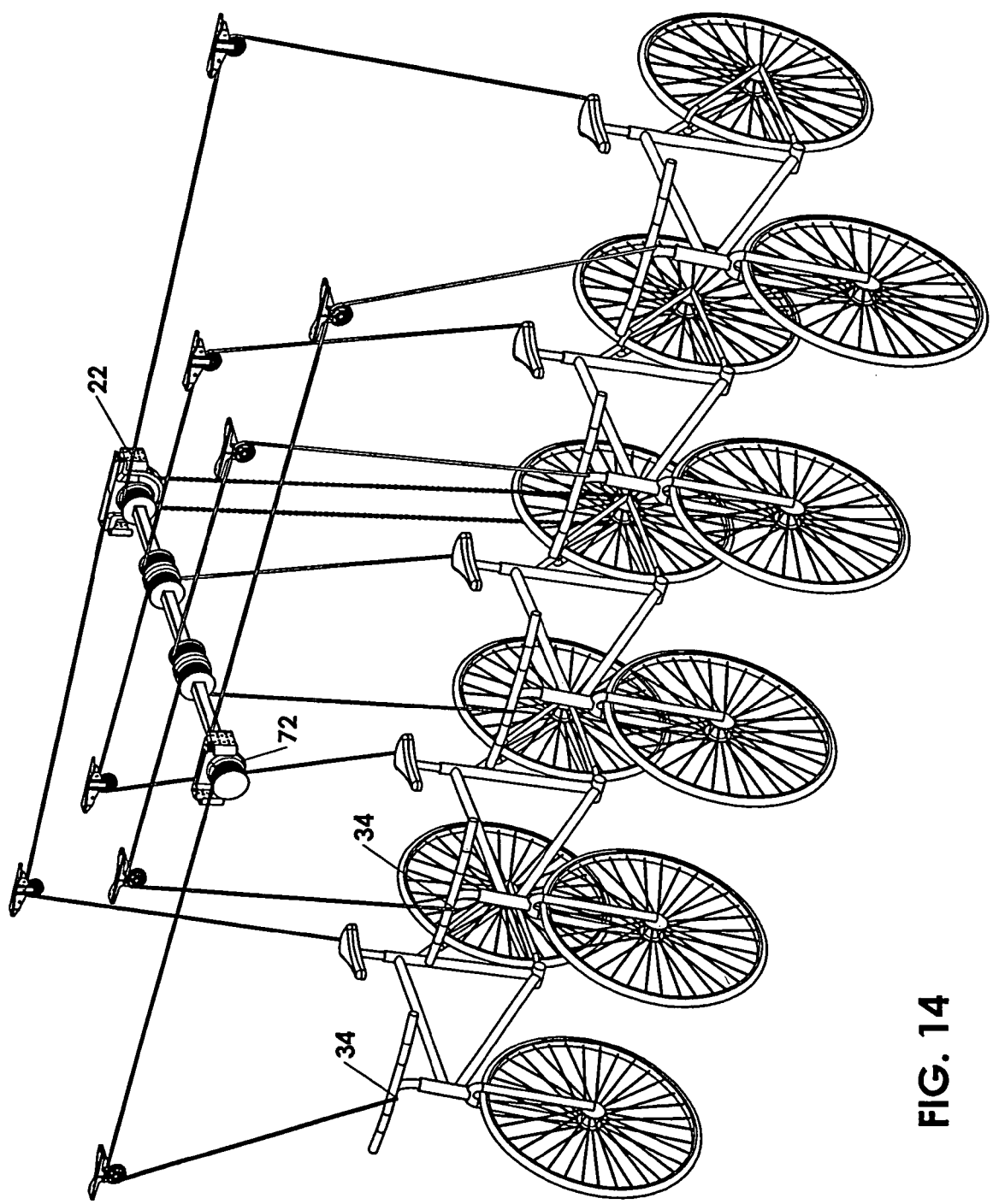
FIG. 14 is a perspective view of a lift mechanism employing a common drive shaft and pulley combination for lifting multiple objects in accordance with the present invention.
Figure 16:
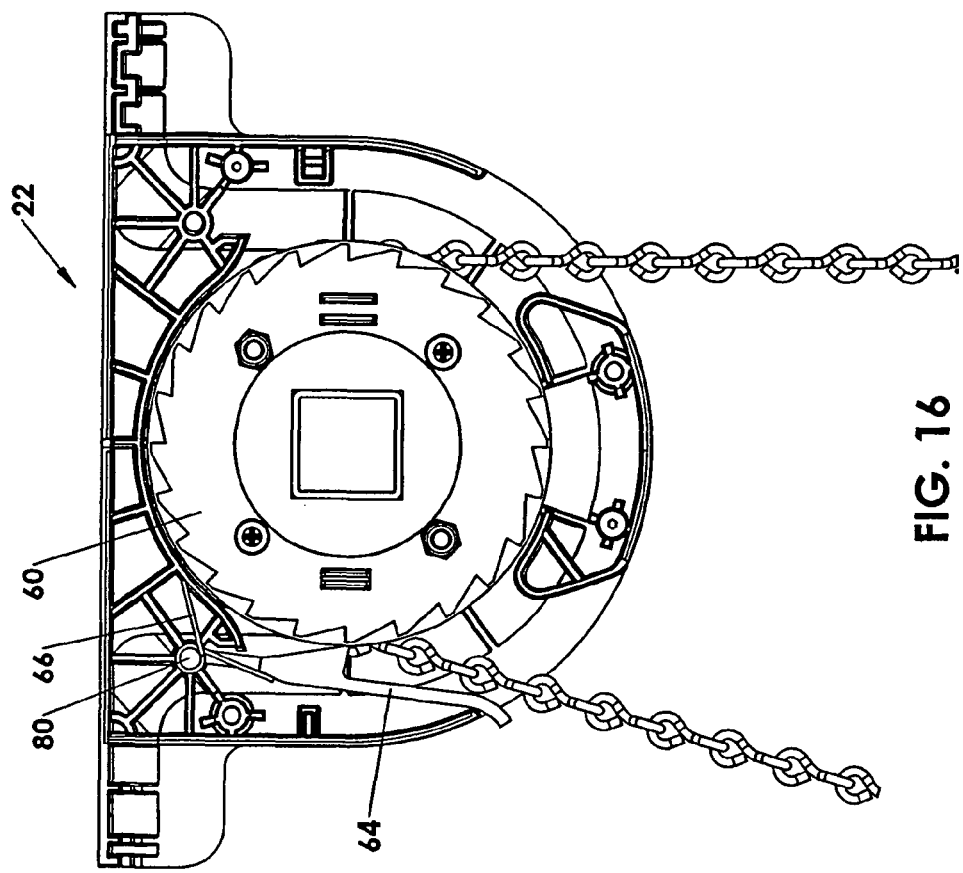
FIG. 16 is a side view of the ratchet mechanism of FIG. 15.
Figure 15:
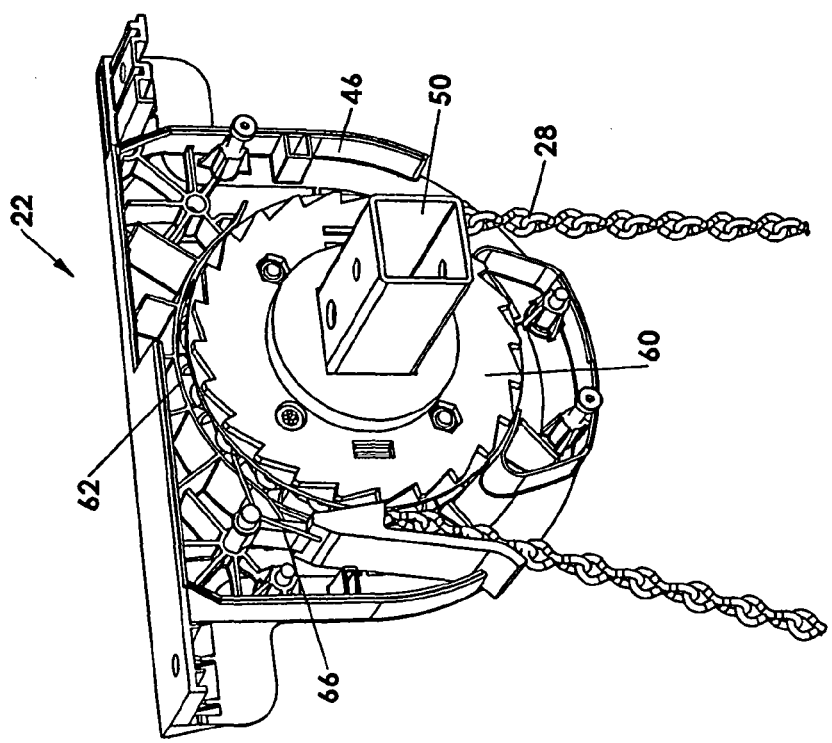
FIG. 15 is a perspective view of a ratchet mechanism in accordance with the present invention with a cover removed to show that it is lowering an object.
Figure 18:
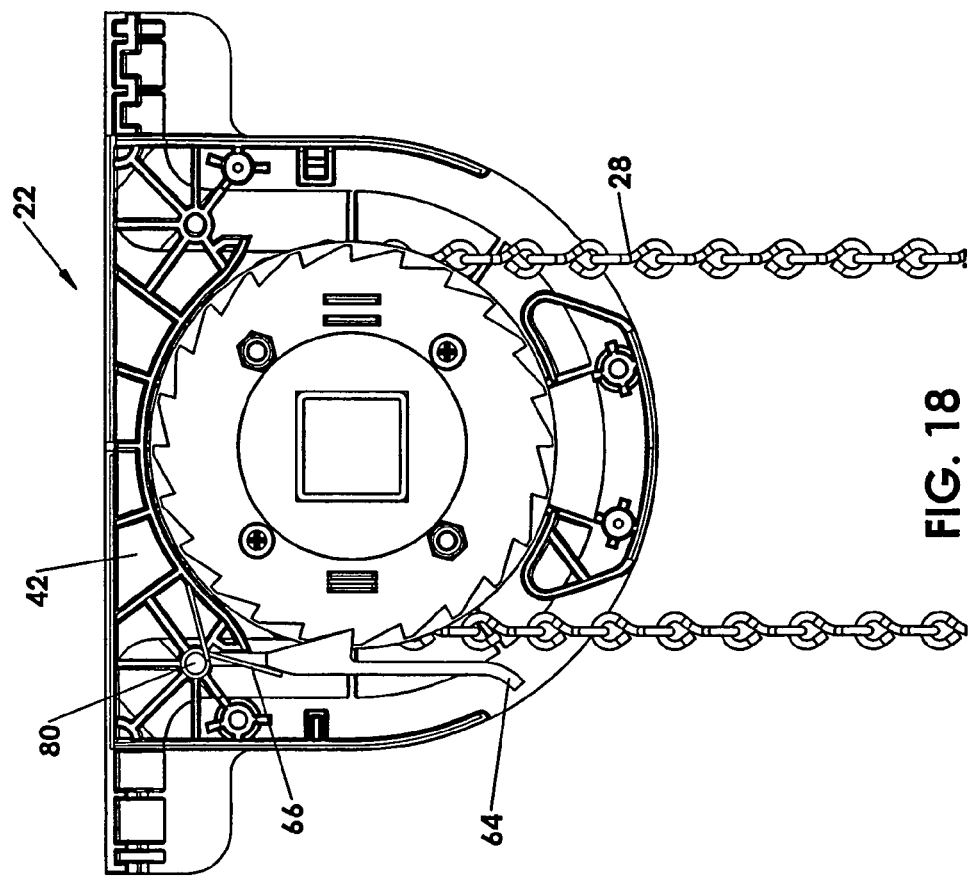
FIG. 18 is a side view of the ratchet mechanism of FIG. 17 in a lifting mode.
Figure 17:
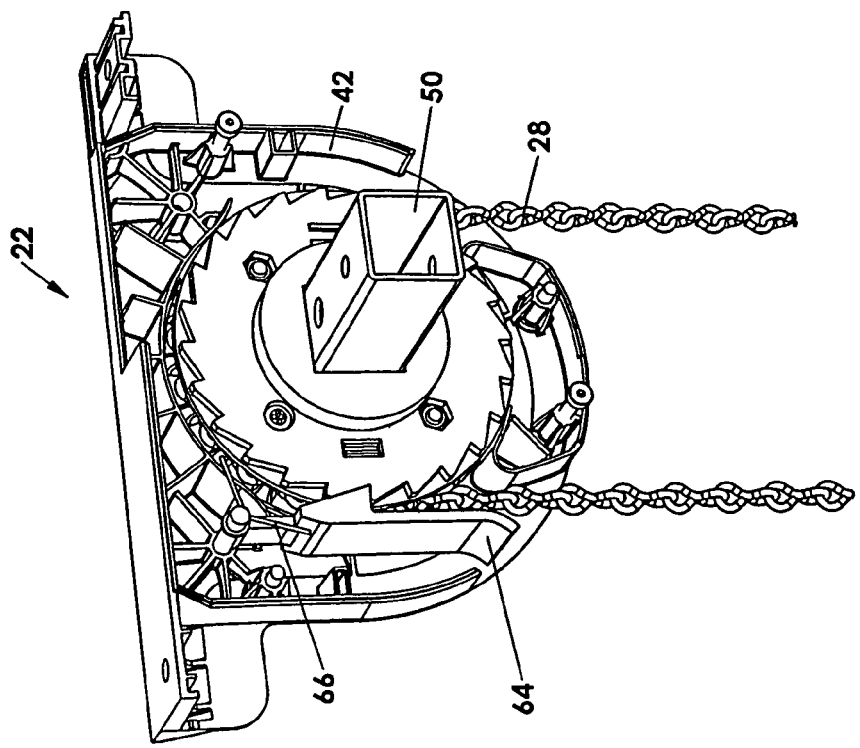
FIG. 17 is a perspective view of the ratchet mechanism in a lifting mode.

As illustrated in FIGS. 13 and 14, the drive shaft 50 can extend from one frame 42 to a passive hoist 72 that is axially aligned with the hoist 22. In this manner, a single drive chain 28 can be used to operate two or more hoists 22 and 72.

Referring back to FIGS. 15 through 18, to operate the hoist system 22, the drive chain 28 is pulled in one direction to raise a load. The drive chain 28 rotates the drive gear 62 and the ratchet gear 60, which in turn rotates the drive shaft 50 and spools 56. A support cable 26 joined to the spool 56 will then be wound up and will raise the load connected to the support cable 26. Mechanical advantage for the operator can be gained by using known pulley arrangements, if desired.

Accidental lowering of the load is prevented because the pawl 64 is biased is by the spring 66 into engagement with the ratchet gear 60, which prevents counter-rotation of the drive shaft 50.

To lower the load, the drive chain 26 is pulled outward (FIGS. 15 and 16) away from the ratchet gear 60, and against the pawl 64. When enough force is applied against the pawl 64 to overcome the bias of the spring 66, the pawl 64 will no longer engage the ratchet gear 60 and the load can be lowered. If the load moves too quickly or the operator loses a grip on the drive chain 28, the spring 66 will reengage the pawl 64 with the ratchet gear 60 and present further downward movement.

Preferably the hoist system 20 is joined to the structure of a garage such as ceiling joists using screws, bolts, or a releasable system such as the FLIP CLIP clamp sold by Inspire Design Group, LLC of 2219 Eagle Drive, Middleton, Wis. 53562, Ph. 608-836-8180.

The invention claimed is:

1. A hoist system comprising:
a frame;
a drive shaft rotatably joined to the frame;
a ratchet gear fixed to the drive shaft for rotation therewith and rotatable in a raising direction and in a lowering direction;
a drive gear joined to the drive shaft for rotation therewith;
a pawl pivotally joined to the frame and biased toward engagement with the ratchet gear to prevent rotation of the ratchet gear in the lowering direction;
a drive chain in engagement with the drive gear to rotate the ratchet gear and the drive shaft, and the drive chain is directly engageable with the pawl for disengaging the pawl from the ratchet gear to permit the ratchet gear to rotate in the lowering direction; and
a spool fixed to the drive shaft for rotation therewith.

2. The hoist system of claim 1, and further comprising:
a support cable joined to the spool.

3. The hoist system of claim 1, and further comprising:
a support cable having a first end portion joined to the spool; and
a passive pulley engaged by the support cable.

4. The hoist system of claim 1, and further comprising:
a support cable having a first end portion joined to the spool;
a passive pulley engaged by the support cable; and
a storage platform joined to a second end portion of the support cable.

5. The hoist system of claim 1, and further comprising:
a support cable having a first end portion joined to the spool;
a passive pulley engaged by the support cable; and
a strap joined to a second end portion of the support cable.

6. The hoist system of claim 1, and further comprising:
a support cable having a first end portion joined to the spool;
a passive pulley engaged by the support cable; and
a hook joined to a second end portion of the supporting cable.

7. The hoist system of claim 1, and further comprising:
a second spool fixed to the drive shaft for rotation therewith.

8. The hoist system of claim 1, and further comprising:
a second spool fixed to the drive shaft for rotation therewith; and
a support cable joined to the second spool.

9. The hoist system of claim 1, and further comprising:
a support cable joined to the second spool; and
a passive pulley engaged by the support cable.

10. The hoist system of claim 1, and further comprising:
a second spool fixed to the drive shaft for rotation therewith;
a support cable having a first end portion joined to the second spool;
a passive pulley engaged by the support cable; and
a storage platform joined to a second end portion of the support cable.

11. The hoist system of claim 1, and further comprising:
a second spool fixed to the drive shaft for rotation therewith;
a support cable having a first end portion joined to the second spool;
a passive pulley engaged by the support cable; and
a strap joined to a second end portion of the support cable.

12. The hoist system of claim 1, and further comprising:
a second spool fixed to the drive shaft for rotation therewith;
a support cable having a first end portion joined to the second spool;
a passive pulley engaged by the support cable; and
a hook joined to a second end portion of the support cable.

13. The hoist system of claim 1, wherein the drive shaft has a transverse cross-section that is square in shape.

14. A hoist system comprising:
a frame;
a drive shaft rotatably joined to the frame;
a ratchet gear fixed to the drive shaft for rotation therewith
a drive gear joined to the drive shaft;
a pawl pivotally joined to the frame and biased toward engagement with the ratcheted gear;
a drive chain in engagement with the drive gear to rotate the drive shaft, the ratchet gear and the drive shaft, and the drive chain is directly engageable with the pawl for disengaging the pawl from the ratchet gear; and
a support cable joined to the drive shaft.

15. A hoist system comprising:
a drive shaft;
a frame rotatably joined to the drive shaft;
a ratchet gear fixed to the drive shaft for rotation therewith and rotatable in a raising direction and in a lowering direction;
a drive gear joined to the drive shaft;
a pawl pivotally joined to the frame and biased toward engagement with the ratchet gear to prevent rotation of the ratchet gear in the lowering direction;
a drive chain in engagement with the drive gear to rotate the ratchet gear, and the drive shaft, and the drive chain is directly engageable with the pawl for disengaging the pawl from the ratchet gear to permit the ratchet gear to rotate in the lowering direction; and
a passive hoist joined to the drive shaft and spaced apart from the frame.

16. The hoist system of claim 15, and further comprising:
a support cable joined to the drive shaft.

17. The hoist system of claim 15, and further comprising:
a spool fixed to the drive shaft for rotation therewith.

18. The hoist system of claim 15, and further comprising:
a spool fixed to the drive shaft for rotation therewith; and
a support cable joined to the spool.

19. The hoist system of claim 15, and further comprising:
a first spool fixed to the drive shaft for rotation therewith; and
a second spool fixed to the drive shaft for rotation therewith.

20. The hoist system of claim 15, and further comprising:
a spool disposed adjacent to the passive hoist and fixed to the drive shaft for rotation therewith; and
a support cable joined to the spool.

* * * * *